US008115815B2

(12) United States Patent
Tsutsui

(10) Patent No.: US 8,115,815 B2
(45) Date of Patent: Feb. 14, 2012

(54) IMAGE PICKUP APPARATUS AND TIME CORRECTION METHOD

(75) Inventor: Masanao Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 12/250,943

(22) Filed: Oct. 14, 2008

(65) Prior Publication Data

US 2009/0141142 A1 Jun. 4, 2009

(30) Foreign Application Priority Data

Nov. 30, 2007 (JP) ................. 2007-311331

(51) Int. Cl.
*H04N 5/228* (2006.01)
*H04N 5/225* (2006.01)
*H04N 9/04* (2006.01)
(52) U.S. Cl. ................. 348/207.99; 348/222.1
(58) Field of Classification Search .............. 348/222.1, 348/207.99; 342/357.52
See application file for complete search history.

(56) References Cited

U.S. PATENT DOCUMENTS

| | | | | |
|---|---|---|---|---|
| 5,296,884 A * | 3/1994 | Honda et al. | .................. | 396/311 |
| 5,449,032 A * | 9/1995 | Blevins et al. | .................. | 160/80 |
| 6,304,212 B1 * | 10/2001 | Aoki et al. | ................ | 342/357.52 |
| 6,563,765 B1 * | 5/2003 | Ishigaki | .......................... | 368/47 |
| 6,574,244 B1 * | 6/2003 | Petrie et al. | .................. | 370/503 |
| 2002/0136094 A1 | 9/2002 | Kawai | | |
| 2006/0187317 A1 * | 8/2006 | Montulli et al. | ........... | 348/231.5 |
| 2008/0117309 A1 * | 5/2008 | Jeon | ........................ | 348/231.2 |

FOREIGN PATENT DOCUMENTS

| | | |
|---|---|---|
| JP | 2000-75070 | 3/2000 |
| JP | 2002-216280 | 8/2002 |
| JP | 2006-29960 | 2/2006 |

OTHER PUBLICATIONS

SonotaCo: "1.Function outline", UFOCaptureV2 Users Manual, [Online], Jul. 10, 2007, XP002571980, Retrieved from the Internet: URL: http://web.archive.org/web/20070710000320/http://sonotaco.com/soft/UFO2/help/english/1-1.html>, [retrieved on Mar. 8, 2010] *the whole document*, 5 pages.

(Continued)

*Primary Examiner* — Nhan T Tran
*Assistant Examiner* — Tuan Le
(74) *Attorney, Agent, or Firm* — Oblon, Spivak, McClelland, Maier & Neustadt, L.L.P.

(57) ABSTRACT

An image pickup apparatus that records a picked-up image and time information indicating when the picked-up image was picked up includes a unit that obtains location information and UTC and generates positioning information indicating the obtained result, a unit that determines the time difference between the time corresponding to the location information and UTC using the location information, a unit that calculates the local time of a location indicated by the location information using UTC and the time difference, and a unit that performs correction of a system time of the image pickup apparatus when the time difference between the system time and the local time exceeds a predetermined time period and that causes the correction of the system time to be delayed until after the completion of a recording operation of the picked-up image when the recording operation is being performed.

9 Claims, 5 Drawing Sheets

OTHER PUBLICATIONS

SonotaCo: "3. Operation", UFOCaptureV2 Users Manual, [Online], Jul. 7, 2007, XP002571981, Retrieved from the Internet: URL:http://web.archive.org/web/20070707162741/sonotaco.com/soft/UFO2/help/english/3-2.html> [retrieved on Mar. 8, 2010] *the whole document*, 9 pages.

SonotaCo: "4. Appendix", UFOCaptureV2 Users Manual, [Online], Jul. 7, 2007, XP002571982, Retrieved from the Internet: URL:http://web.archive.org/web/20070707162946/http://sonotaco.com/soft/UFO2/help/english/4-1.html> [retrieved on Mar. 8, 2010] *the whole document*, 6 pages.

European Office Action issued Mar. 29, 2011, in Patent Application No. 08 170 094.0.

European Summons to Attend Oral Proceedings Pursuant to Rule 115(1) EPC, issued on Sep. 20, 2011 in Application No./Patent No. 08170094.0-2202/2066115.

UFOCaptureV2 Users Manual, XP-002571980, Function Outline, pp. 1-5.

UFOCapture V2 Users Manual, XP-002571981, Operation, pp. 1-9.

UFOCapture V2 Users Manual, XP-002571982, Appendix, pp. 1-6.

* cited by examiner

FIG. 2

$GPGGA,123519.000,2233.2323,N,12351.3215,E,1,04,···

| NAME | EXEMPLARY DATA | CONTENTS |
|---|---|---|
| MESSAGE ID | $GPGGA | GGA PROTOCOL HEADER |
| UTC POSITION | 123519.000 | hhmmss.sss |
| LATITUDE | 2233.2323 | ddmm.mmmm |
| N/S INDICATOR | N | N=NORTH S=SOUTH |
| LONGITUDE | 12351.3215 | ddmm.mmmm |
| E/W INDICATOR | E | E=EAST W=WEST |
| POSITION FIX INDICATOR | 1 | |
| SATELLITES USED | 04 | |
| ⋮ | | |

FIG. 5

| LONGITUDE RANGE | LATITUDE RANGE | TIME DIFFERENCE | DAYLIGHT SAVING TIME INFORMATION |
|---|---|---|---|
| ⋮ | ⋮ | ⋮ | ⋮ |
| E02000.0000 - E02500.0000 | ⋮ | ⋮ | ⋮ |
| | N5000.0000 - N4500.0000 | +1 | ONE O'CLOCK A.M. ON LAST SUNDAY IN MARCH THROUGH ONE O'CLOCK A.M. ON LAST SUNDAY IN OCTOBER (UTC STANDARD) |
| | ⋮ | ⋮ | ⋮ |
| | N3000.0000 - N2500.0000 | +1 | DAYLIGHT SAVING TIME NOT USED |
| | ⋮ | ⋮ | ⋮ |
| ⋮ | ⋮ | ⋮ | ⋮ |

IMAGE PICKUP APPARATUS AND TIME CORRECTION METHOD

CROSS REFERENCES TO RELATED APPLICATIONS

The present invention contains subject matter related to Japanese Patent Application JP 2007-311331 filed in the Japanese Patent Office on Nov. 30, 2007, the entire contents of which are incorporated herein by reference.

BACKGROUND OF THE INVENTION

1. Field of the Invention

The present invention relates to an image pickup apparatus and a time correction method. The present invention relates more specifically to, in a case in which a recording operation of a picked-up image is being performed when the time difference between a system time of the image pickup apparatus and a local time exceeds a predetermined time period, an image pickup apparatus and a time correction method that cause the correction of the system time to be delayed until after the completion of the recording operation.

2. Description of the Related Art

Image pickup apparatuses, for example, video cameras and digital cameras, have a clock function, and are capable of recording a picked-up image in association with the date or the time when the picked-up image was picked up. In a case in which a user goes on a trip with such an image pickup apparatus having the clock function, when there is a time difference between a place of departure and a destination, it is necessary to perform a time correction operation in which the time of the image pickup apparatus (hereinafter referred to as the "system time") is set to the local time of the destination. If the time correction operation for setting the system time to the local time of the destination is not performed, a problem may occur in that, for example, a picked-up image taken during the daytime is associated with a time during the nighttime, and the clock function is not properly utilized.

Thus, in Japanese Unexamined Patent Application Publication No. 2000-75070, a technology for calculating the local time with a positioning technology and automatically correcting the system time of an image pickup apparatus to the local time has been proposed. In this way, if the system time of the image pickup apparatus is automatically corrected to the local time, a picked-up image can be recorded in association with the correct time even if a user does not perform the time correction operation himself/herself.

SUMMARY OF THE INVENTION

When a user moves to a country or area whose local time is different from that of the previous country or area, if the system time of an image pickup apparatus is automatically corrected to the local time, the time may be moved forward or backward during an image pickup operation. Thus, when moving images are recorded as picked-up images, inconsistencies may occur in terms of the time that is recorded in the moving images. Moreover, inconsistencies may also occur between the time recorded in the moving images when the image pickup operation is started and the time when the moving images are registered as a moving-image file in the file system. For example, if the system time is corrected by being moved backward during recording of moving images, the time of the moving-image file registered in the file system after the completion of the recording operation indicates a time prior to the time when the image pickup operation was started, and thus an inconsistency occurs.

Thus, it is desirable to provide an image pickup apparatus and a time correction method capable of automatically correcting the time thereof to a correct time while inconsistencies in time information are being prevented from occurring.

When a user moves through an area in which there is a time difference between local times while a picked-up image is being recorded, it is desirable to cause the correction of the system time to be delayed until after the completion of recording of the picked-up image even if a time difference occurs between the system time of an image pickup apparatus and the local time because the user has moved through the area.

An image pickup apparatus according to an embodiment of the present invention is an image pickup apparatus that records a picked-up image and time information indicating when the picked-up image was picked up. The image pickup apparatus includes a positioning information generation unit that obtains location information and Coordinated Universal Time and generates positioning information indicating the obtained result, a time difference determination unit that determines the time difference between the time corresponding to the location information and Coordinated Universal Time using the location information indicated by the positioning information, a local time calculation unit that calculates the local time of a location indicated by the location information indicated by the positioning information using Coordinated Universal Time indicated by the positioning information and the time difference, and a time correction unit that performs correction of a system time of the image pickup apparatus when the time difference between the system time and the local time exceeds a predetermined time period and that causes the correction of the system time to be delayed until after the completion of a recording operation of the picked-up image when the recording operation is being performed.

Moreover, a time correction method according to an embodiment of the present invention is a time correction method for an image pickup apparatus that records an image signal of a picked-up image and time information indicating when the picked-up image was picked up. The time correction method includes the steps of obtaining location information and Coordinated Universal Time and generating positioning information indicating the obtained result, determining the time difference between the time corresponding to the location information and Coordinated Universal Time using the location information indicated by the positioning information, calculating the local time of a location indicated by the location information indicated by the positioning information using Coordinated Universal Time indicated by the positioning information and the time difference, and correcting a system time of the image pickup apparatus when the time difference between the system time and the local time exceeds a predetermined time period and that causes the correction of the system time to be delayed until after the completion of a recording operation of the picked-up image when the recording operation is being performed.

According to an embodiment of the present invention, the location information and Coordinated Universal Time are obtained by receiving a radio signal, for example, a GPS signal. Moreover, the time difference between the time corresponding to the location information and Coordinated Universal Time is determined using the location information, and the local time of the location indicated by the location information is calculated using this time difference and the daylight saving time information. Here, when the time difference between the system time indicated by the image pickup apparatus and the local time exceeds a predetermined time period, the correction of the system time is performed. Moreover, if the recording operation of a picked-up image is being performed, the correction of the system time is caused to be delayed until after the completion of the recording operation. Thereafter, when the correction of the system time is performed, an indication regarding the fact is displayed.

According to an embodiment of the present invention, even when a user moves to an area whose local time is different from that of the previous area while a picked-up image is being recorded, the correction of the system time is not performed during the recording operation of the picked-up image, and the system time is corrected to the correct time after the completion of the recording operation. Thus, even if the user does not pay attention to whether he or she has moved to an area whose local time is different from that of the previous area or whether a picked-up image is being recorded, the system time of the image pickup apparatus can be automatically corrected without occurrence of inconsistencies such as inconsistencies in terms of the time when a moving-image file was recorded. Moreover, the correction of the system time is performed in accordance with UTC, the location information, and the daylight saving time information, and thus the system time can be corrected to the correct time.

BRIEF DESCRIPTION OF THE DRAWINGS

FIG. 2 is a diagram showing part of positioning information;

FIG. 5 is a diagram showing a table.

DESCRIPTION OF THE PREFERRED EMBODIMENTS

Figure 1:
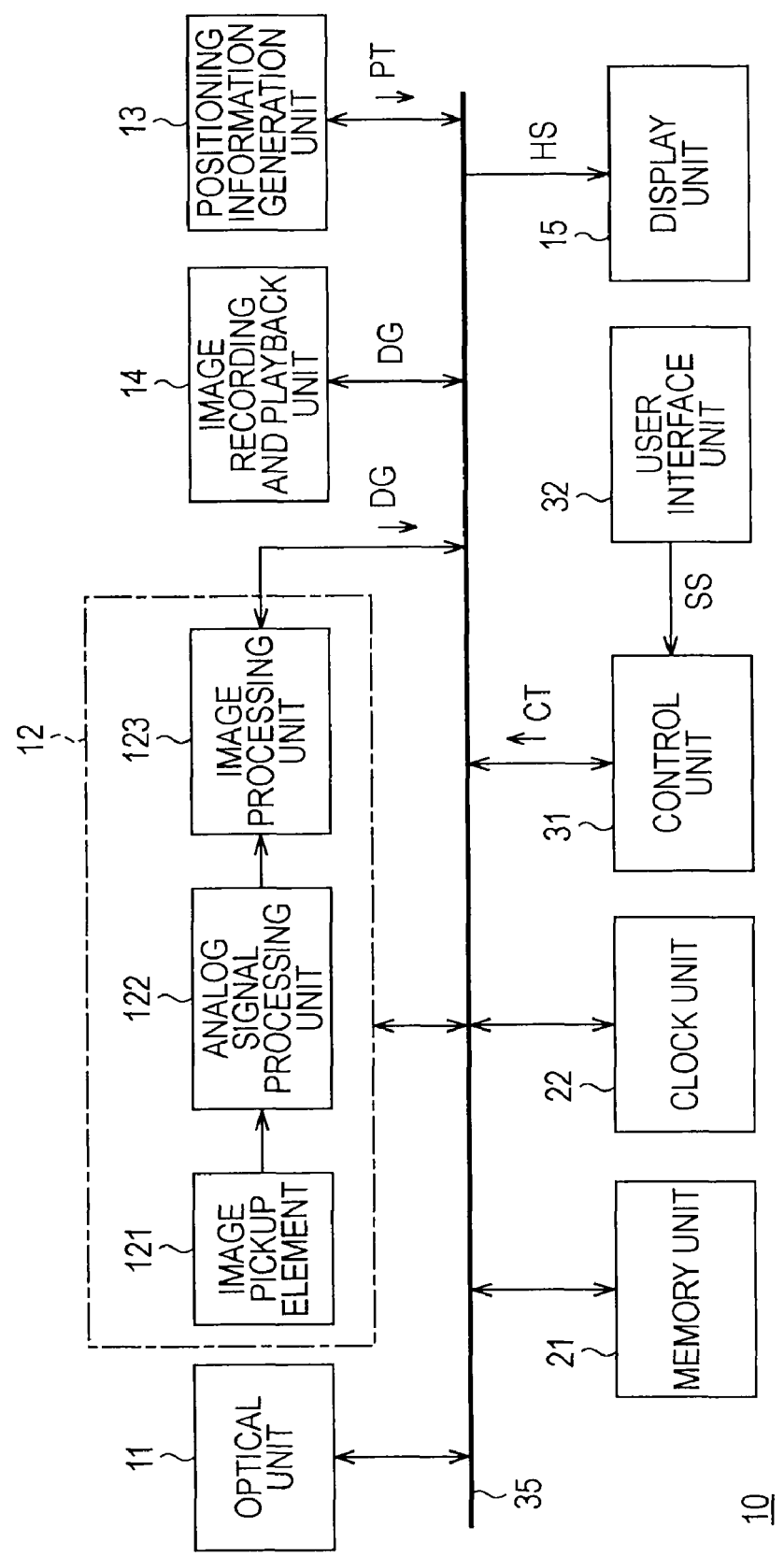
FIG. 1 is a diagram showing a structure of an image pickup apparatus.

In the following, an embodiment of the present invention will be described with reference to the attached drawings. FIG. 1 shows a structure of an image pickup apparatus according to the embodiment of the present invention.

An optical unit 11 of an image pickup apparatus 10 includes a lens, a zoom mechanism, and the like. The optical unit 11 causes an optical image to be formed on an image pickup surface of an image pickup element 121 arranged in a backward direction of the optical axis of the lens.

The image pickup element 121 of an image pickup unit 12 generates an analog image signal corresponding to the optical image by performing photo-electric conversion and supplies the analog image signal to an analog signal processing unit 122. The analog signal processing unit 122 performs analog image signal processing such as noise reduction, gain control, and the like, on the analog image signal supplied from the image pickup element 121. Moreover, the analog signal processing unit 122 includes an analog-to-digital (A/D) converter, and the analog image signal on which the analog signal processing has been performed is converted into a digital image signal, and the digital image signal is supplied to an image processing unit 123.

The image processing unit 123 performs digital image signal processing such as color adjustment, image-quality adjustment, and the like, on the digital image signal supplied from the analog signal processing unit 122. Moreover, the processing of compressing the image signal on which the digital image signal processing has been performed, the processing of decompressing the image signal which has been compressed, and the like are performed. As examples of a compression format, the Moving Picture Expert Group (MPEG) format is used in the case of recording moving images, and a lossy compression format such as the Joint Photographic Expert Group (JPEG) format is used in the case of recording a still image. Moreover, the image processing unit 123 may generate a lossless-compressed signal or an uncompressed signal in the PAW format, or may generate an uncompressed signal in the Tagged Image File Format (TIFF). In the following, an uncompressed or compressed image signal is simply referred to as an image signal DG.

A positioning information generation unit 13 obtains location information and Coordinated Universal Time (UTC) and generates positioning information PT indicating the obtained result. The positioning information generation unit 13 includes, for example, a Global Positioning System (GPS) device. The GPS device includes an antenna unit that receives a GPS signal, a signal conversion unit that converts the received GPS signal, a calculation unit that calculates location information, an UTC information generation unit, and the like. The GPS device receives a GPS signal and generates the positioning information, for example, positioning information PT in National Marine Electronics Association (NMEA)-0183 format.

FIG. 2 shows part of the positioning information PT in the NMEA-0183 format generated by the positioning information generation unit 13, for example, a GGA data sentence. Here, the data shown in FIG. 2 is an example. "Message ID" indicates that the data is a GGA data sentence. Here, the top "$" is an identifier that indicates the start of a character string, and "GP" is an identifier that indicates positioning information provided by GPS. "UTC Position" indicates the time when the positioning information was obtained in UTC. "Latitude" indicates a latitude, and "N/S Indicator" indicates whether the latitude is a northern latitude or a southern latitude. "Longitude" indicates a longitude, and "E/W Indicator" indicates whether the longitude is an eastern longitude or a western longitude. "Position fix Indicator" indicates a GPS grade, and "Satellites used" indicates the number of reception satellites. Moreover, in addition to the GGA data sentence, the positioning information PT also contains a ZDA data sentence or an RMC data sentence, and thus information on the date in UTC can be obtained.

Moreover, instead of the GPS signal, the positioning information generation unit 13 may receive a radio signal different from the GPS signal, and may generate the positioning information PT. For example, the positioning information generation unit 13 includes a communication device, and generates location information by calculating an arrival-time difference between radio waves transmitted from mobile phone base stations or generates location information by estimating distances from the image pickup apparatus 10 to Personal Handyphone System (PHS) base stations on the basis of the intensity of radio waves transmitted from the PHS base stations. Moreover, the location information can be generated by receiving radio waves transmitted from digital terrestrial television stations and using an arrival-time difference between the radio waves or the location information can be generated by communicating with an access point of a wireless local-area network (LAN) or the like. Moreover, UTC can be obtained by accessing a time server via a network.

An image recording and playback unit 14 includes a recording medium, for example, a nonvolatile memory or an optical disc, a hard disk device, and the like. The image recording and playback unit 14 records the image signal DG of a picked-up image, for example, the image signal DG of a still image or that of moving images, in association with time information such as the time when the still image or moving images were picked up. Moreover, the image recording and playback unit 14 plays back the image signal DG recorded on the recording medium. Here, if the image signal DG and the like are recorded in a file format, the management of the recorded image signal DG is easy.

A display unit 15 includes a liquid crystal display (LCD) element and the like. The display unit 15 displays an image observed through a finder using an image signal output from the image pickup unit 12. Moreover, the display unit 15 displays a picked-up image using an image signal stored in the image recording and playback unit 14, various menu screens, and the like.

In a memory unit 21, a program used for operating the image pickup apparatus 10 and a table containing information used for calculating a time difference are stored. Moreover, in a case in which it is estimated that the image pickup apparatus 10 is used in a country using daylight saving time, information that makes a period in which a time is shifted forward identifiable (hereinafter referred to as "daylight saving time information") is contained in the table.

A clock unit 22 generates time information indicating the system time of the image pickup apparatus 10, and supplies the generated time information to a control unit 31. Moreover, the system time of the clock unit 22 can be adjusted by the control unit 31.

A user interface unit 32 is connected to the control unit 31. The user interface unit 32 includes a shutter button, an operation dial for switching between image pickup modes, and the like. The user interface unit 32 generates an operation signal SS in response to a user operation and supplies the operation signal SS to the control unit 31.

The control unit 31 is connected to various units via a bus 35. The control unit 31 causes the operation of the image pickup apparatus 10 to start by reading and executing a program stored in the memory unit 21. Moreover, the control unit 31 generates a control signal CT in response to the operation signal SS supplied from the user interface unit 32 and supplies the control signal CT to the various units, whereby the image pickup apparatus 10 is caused to be operated in response to the user operation.

Moreover, the control unit 31 determines the time difference between the time corresponding to the location information and UTC using the location information indicated by the positioning information PT generated by the positioning information generation unit 13, and calculates the local time of the location indicated by the location information using this time difference and UTC indicated by the positioning information PT. Here, in a case in which it is estimated that the image pickup apparatus 10 is used in a country using daylight saving time, the local time is calculated additionally using the daylight saving time information. Moreover, the control unit 31 performs the correction operation of the system time in accordance with the system time indicated by the clock unit 22, the calculated local time, and an operation state of the image pickup apparatus 10.

Figure 3:
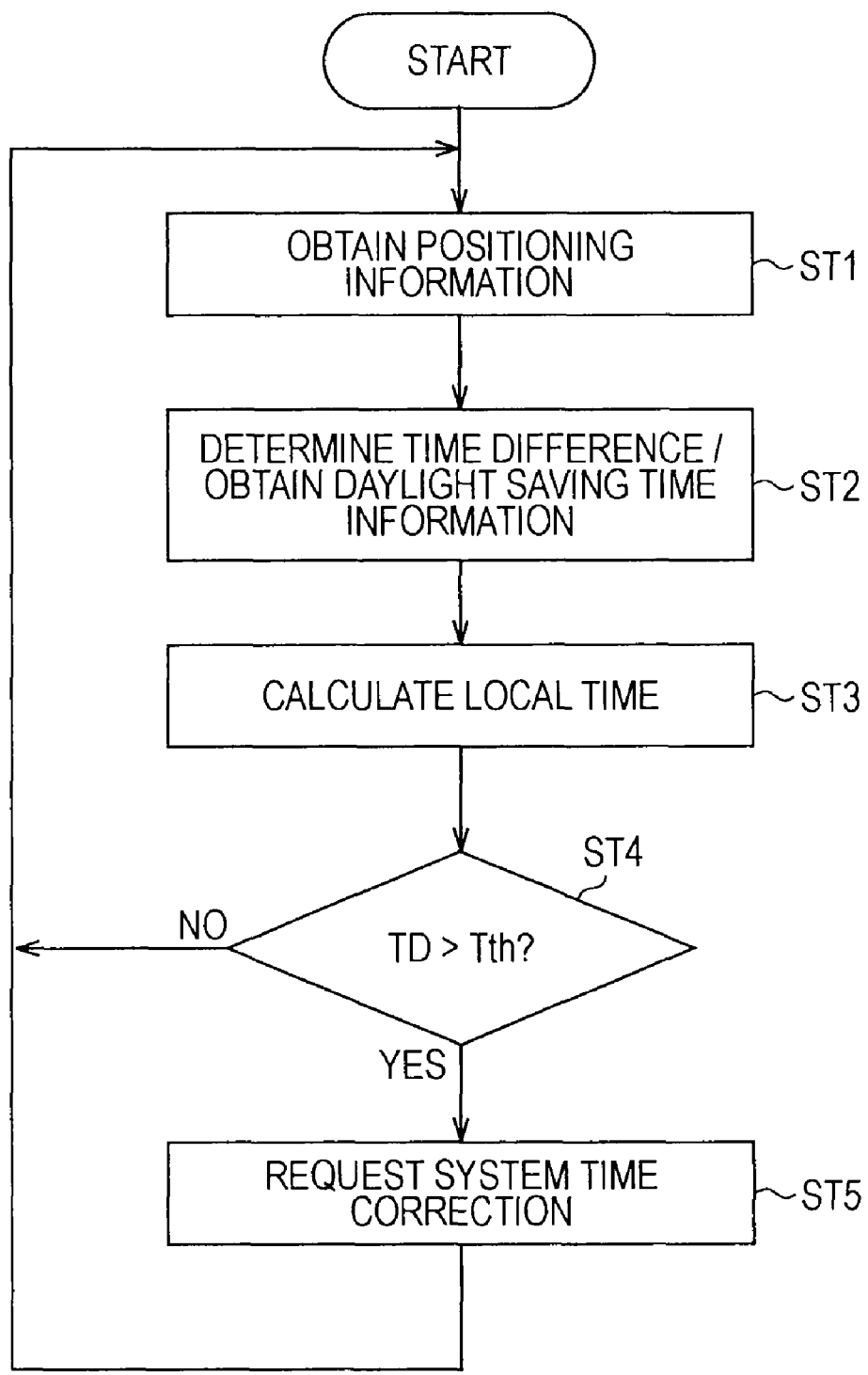
FIG. 3 is a flowchart showing a correction determination operation.
Figure 4:
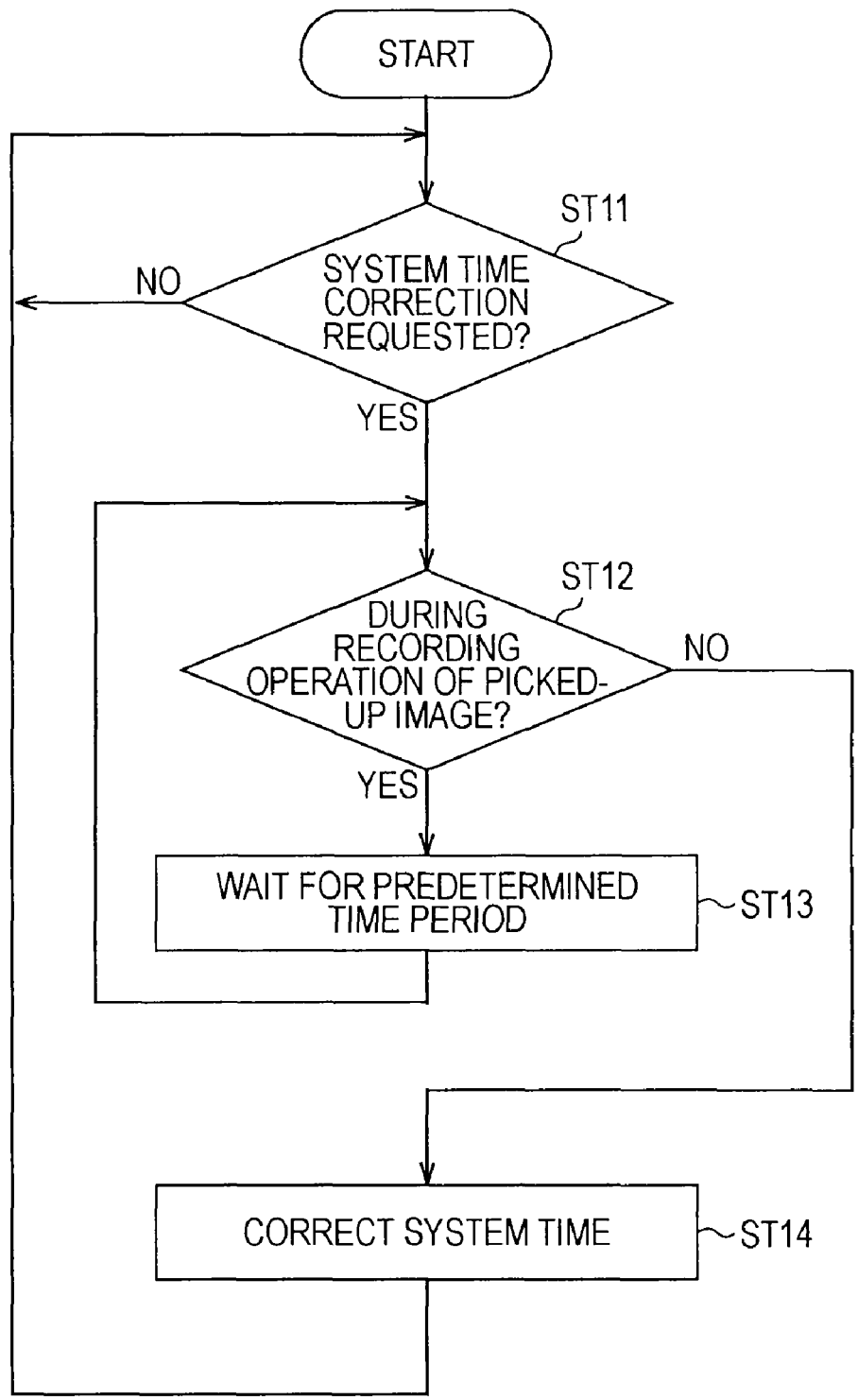
FIG. 4 is a flowchart showing a correction processing operation.

Next, the correction operation of the system time of the image pickup apparatus will be described. FIG. 3 is a flowchart showing a correction determination operation for determining whether the correction of the system time is necessary. FIG. 4 is a flowchart showing a correction processing operation when it was determined by the determination operation performed in FIG. 3 that the correction of the system time is necessary.

Here, if there is a long interval between such determination operations in which it is determined whether the correction of the system time is necessary, when a user moves to an area whose time difference from UTC is different from that of the previous area, the system time is not promptly corrected. Thus, it is desirable that there be a short interval between the determination operations in which it is determined whether the correction of the system time is necessary. On the other hand, the correction operation of the system time should be performed only when it is determined that the correction of the system time is necessary. That is, it is desirable that the determination operation as to whether it is necessary to perform the correction of the system time be not synchronized with the correction operation of the system time. Thus, when it is determined that the correction of the system time is necessary, a request for correcting the system time is made to a different process or a sled operation in the operation shown in FIG. 3, and the correction processing operation shown in FIG. 4 is performed in the different process or the sled operation.

In step ST1 in FIG. 3, the control unit 31 obtains the positioning information PT generated by the positioning information generation unit 13 and the procedure proceeds to step ST2. As described above, the positioning information PT generated by the positioning information generation unit 13 contains information indicating a latitude, a longitude, and UTC, and thus, the control unit 31 can determine the current location and the current UTC by obtaining the positioning information PT.

In step ST2, the control unit 31 determines a time difference. Moreover, in a case in which it is estimated that the image pickup apparatus 10 is used in a country using daylight saving time, the control unit 31 obtains the daylight saving time information. The control unit 31 calculates a time difference between the time of the current location and UTC using the latitude and the longitude indicated by the positioning information. For example, a table is generated in a manner such that the time difference between the time of the current location and UTC is obtained when a latitude and a longitude are specified, and the table is stored in the memory unit 21. Moreover, the control unit 31 uses the latitude and the longitude of the current location in order to obtain the corresponding daylight saving time information. For example, a table is generated in a manner such that the daylight saving time information corresponding to the current location is obtained when a latitude and a longitude are specified, and the table is stored in the memory unit 21. If a table was generated in this way, a time difference is easily determined and daylight saving time information is easily obtained.

FIG. 5 shows an exemplary table. In this table, an area is divided into mesh-shaped regions in units of minutes or seconds in terms of the latitude and longitude. For each of the regions, this table shows the time difference and daylight saving time information thereof.

For example, in the range from an eastern longitude of 20 degrees to an eastern longitude of 25 degrees (E02000.0000 through E02500.0000), the range from a northern latitude of 50 degrees to a northern latitude of 40 degrees indicates the location of Europe. Moreover, the corresponding daylight saving time information indicates that the time in this region is shifted forward by one hour from one o'clock a.m. on the last Sunday in March to one o'clock a.m. on the last Sunday in October (UTC Standard). The range from a northern latitude of 30 degrees to a northern latitude of 25 degrees indicates the location of Africa. The corresponding daylight saving time information indicates that the daylight saving time is not used in this region.

Here, for each of the mesh-shaped regions that are obtained by dividing an area, this table in FIG. 5 shows the time difference and the daylight saving time information; however, the area is not divided into mesh-shaped regions on every occasion. For example, regions having the same time difference and the same daylight saving time information are stored as polygon data in terms of the latitude and longitude, and the time difference and daylight saving time information for the region which includes the latitude and the longitude of the current location may be read out.

In step ST3, the control unit 31 calculates the local time. The control unit 31 calculates a time by adding UTC and the time difference. In addition, if the calculated time is in the daylight saving time period, the calculated time is corrected, and the corrected time is treated as the local time, which is the time of the current location, and the procedure proceeds to step ST4. If the calculated time is not in the daylight saving time period or the daylight saving time is not used, the time obtained by adding UTC and the time difference is treated as the local time, and the procedure proceeds to step ST4.

In step ST4, the control unit 31 determines whether a time difference TD between the system time and the local time exceeds a predetermined time period Tth. The control unit 31 calculates the time difference TD between the local time calculated in step ST3 and the system time indicated by the clock unit 22. Here, if the time difference TD does not exceed the predetermined time period Tth, the procedure returns to step ST1. If the time difference TD exceeds the predetermined time period Tth, the procedure proceeds to step ST5.

In step ST5, the control unit 31 makes a system time correction request, and the procedure returns to step ST1.

In step ST11 in FIG. 4, the control unit 31 determines whether the system time correction request has been made. Here, if the system time correction request has not been made, the procedure returns to step ST11. If the system time correction request has been made, the procedure proceeds to step ST12.

In step ST12, the control unit 31 determines whether the recording operation of a picked-up image is being performed. If the control unit 31 determined that the operation in which the image signal DG obtained by the image pickup unit 12 is recorded on a recording medium by the image recording and playback unit 14 is being performed, the procedure proceeds to step ST13. If the recording operation of a picked-up image is completed or the recording operation of a picked-up image is not being performed, the procedure proceeds to step ST14.

In step ST13, the control unit 31 waits for a predetermined time period, and the procedure returns to step ST12.

In step ST14, the control unit 31 performs correction of the system time. That is, the control unit 31 corrects the system time indicated by the clock unit 22 so as to cause the time difference between the system time calculated in step ST4 and the local time to be "0", and then the procedure returns to step ST11. Here, when the system time is corrected, an indication regarding the fact is displayed on the display unit 15. If such an indication is displayed, the user can check that the system time has been automatically corrected to the local time of the current location.

If the system time is corrected in this way, even when a user moves to a country or area whose local time is different from that of the previous country or area while a picked-up image is being recorded, inconsistencies in terms of the time does not occur when picked-up images are recorded as moving images since the system time is not corrected during the recording operation. Moreover, since the system time is corrected after the completion of the recording operation, even if the user does not check whether he or she moves to a country or area whose local time is different from that of the previous country or area, that is, he or she is in a different time zone and the user does not perform the correction operation of the system time himself/herself as necessary, the system time of the image pickup apparatus can automatically be corrected to the time of the current location.

Moreover, in the correction processing operation shown in FIG. 4, the system time is automatically corrected when the system time correction request is made; however, the system time may be automatically corrected when user's permission is obtained. More specifically, when it has been determined that no system time correction request was made in step ST11, it is determined whether the user's permission has been obtained, and if it is determined that the user's permission has been obtained, the processing in and after step ST12 will be performed.

In this way, the system time is corrected only when the user's permission has been obtained, and thus automatic correction of the system time can be avoided in a case in which it is not necessary to change the system time because a time period is short during which the user is moving in an area whose local time is different from that of the previous area, or in a case in which the time that the user desires is to be recorded as the system time.

It should be understood by those skilled in the art that various modifications, combinations, sub-combinations and alterations may occur depending on design requirements and other factors insofar as they are within the scope of the appended claims or the equivalents thereof.

What is claimed is:

1. An image capture apparatus that records an image and time information indicating when the image was picked up, the image capture apparatus comprising:
   a positioning information generation unit that
      obtains location information and Coordinated Universal Time, and
      generates positioning information based on the location information and Coordinated Universal Time;
   a time difference determination unit that determines a time difference between a time corresponding to the location information and the Coordinated Universal Time using the positioning information;
   a local time calculation unit that calculates a local time of a location indicated by the positioning information using the Coordinated Universal Time and the time difference; and
   a time correction unit that
      performs correction of a system time of the image capture apparatus in response to a time difference between the system time and the local time exceeding a predetermined time period, and
      causes, when a recording operation is being performed, the correction of the system time to be automatically delayed until after the completion of the recording operation of the image by the image capture apparatus.

2. The image pickup apparatus according to claim 1, further comprising:
   a daylight-saving-time information storage unit in which daylight saving time information indicting a period in which time is shifted forward is stored,
   wherein the local time calculation unit calculates the local time using the Coordinated Universal Time, the time difference, and the daylight saving time information.

3. The image pickup apparatus according to claim 2,
wherein the positioning information generation unit obtains the location information and Coordinated Universal Time by receiving a radio signal.

4. The image pickup apparatus according to claim 3, wherein the positioning information generation unit is a Global Positioning System (GPS) device.

5. The image pickup apparatus according to claim 3, wherein the positioning information generation unit is a communication device that performs wireless communication via a network.

6. The image pickup apparatus according to claim 3, further comprising:
a display unit that displays an indication regarding that the system time has been corrected on a screen of the display unit after the time correction unit corrects the system time.

7. The image pickup apparatus according to claim 6, further comprising:
a user interface unit that generates an operation signal in response to a user operation,
wherein, before the time correction unit corrects the system time, the time correction unit displays an indication that the system time is to be corrected on a screen of the display unit, and performs correction of the system time when the operation signal indicates a correction request of the system time.

8. A time correction method for an image capture apparatus that records an image signal of an image and time information indicating when the image was picked up, the time correction method comprising:
obtaining location information and Coordinated Universal Time;
generating positioning information based on the location information and Coordinated Universal Time;
determining, via the positioning information, the time difference between a time corresponding to the location information and the Coordinated Universal Time;
calculating the local time of a location indicated by the positioning information using the Coordinated Universal Time and the time difference;
correcting a system time of the image capture apparatus in response to a time difference between the system time and the local time exceeding a predetermined time period; and
causing, when a recording operation is being performed, the correction of the system time to be automatically delayed until after the completion of the recording operation of the image by the image capture apparatus.

9. A non-transitory computer-readable medium storing computer readable instructions thereon for an image capture apparatus that records an image signal of an image and time information indicating when the image was picked up, the computer-readable instructions when executed by a the image capture apparatus causing the image capture apparatus to perform a method comprising:
obtaining location information and Coordinated Universal Time;
generating positioning information based on the location information and Coordinated Universal Time;
determining, via the positioning information, a time difference between a time corresponding to the location information and the Coordinated Universal Time;
calculating the local time of a location indicated by the positioning information using the Coordinated Universal Time and the time difference;
correcting a system time of the image capture apparatus in response to a time difference between the system time and the local time exceeding a predetermined time period; and
causing, when a recording operation is being performed, the correction of the system time to be automatically delayed until after the completion of the recording operation of the image by the image capture apparatus.

* * * * *